United States Patent [19]

Edson et al.

[11] Patent Number: 4,532,507

[45] Date of Patent: Jul. 30, 1985

[54] SECURITY SYSTEM WITH MULTIPLE LEVELS OF ACCESS

[75] Inventors: James B. Edson, Concord, Mass.; Patrick G. Monroe, Ridgewood, N.J.

[73] Assignee: American District Telegraph Company, New York, N.Y.

[21] Appl. No.: 549,632

[22] Filed: Nov. 4, 1983

Related U.S. Application Data

[63] Continuation of Ser. No. 295,621, Aug. 25, 1981, abandoned.

[51] Int. Cl.[3] ........................ H04Q 9/00; G08B 19/00

[52] U.S. Cl. .............................. 340/825.31; 340/541; 340/825.56; 340/825.36

[58] Field of Search ...................... 340/825.44, 825.03, 340/825.05, 825.36, 825.56, 825.31, 825.32, 825.34, 825.22, 501, 528, 506, 537, 306, 543, 514, 825.37, 541, 542, 543, 825.5; 235/382

[56] References Cited

U.S. PATENT DOCUMENTS

| | | | |
|---|---|---|---|
| 3,866,173 | 2/1975 | Moorman et al. | 340/825.31 |
| 4,021,796 | 5/1977 | Fawcett, Jr. et al. | 340/825.32 |
| 4,023,139 | 5/1977 | Samburg | 340/506 |
| 4,100,534 | 7/1978 | Shifflet, Jr. | 340/825.31 |
| 4,121,053 | 10/1978 | Dick | 340/825.76 |
| 4,148,012 | 4/1979 | Baump et al. | 340/825.32 |
| 4,189,719 | 2/1980 | Massa et al. | 340/528 |
| 4,218,690 | 8/1980 | Ulch et al. | 340/825.31 |
| 4,308,911 | 1/1982 | Mandl | 340/501 |
| 4,315,247 | 2/1982 | Germanton | 340/825.31 |
| 4,333,074 | 6/1982 | Sutherland et al. | 340/825.36 |

FOREIGN PATENT DOCUMENTS

| | | |
|---|---|---|
| 1369537 | 10/1974 | United Kingdom . |
| 1448141 | 9/1976 | United Kingdom . |
| 1604157 | 12/1981 | United Kingdom . |

*Primary Examiner*—Donald J. Yusko
*Attorney, Agent, or Firm*—Weingarten, Schurgin, Gagnebin & Hayes

[57] ABSTRACT

A security system is provided with multiple levels of access in which a higher level pass code gives the user access to numerous system functions, such as disarming of the system, resetting, system testing, loop by-passing, and system programming, whereas a lower level pass code gives the user access to less functions, in one embodiment to disarming only a portion of the system. In one embodiment, an eraseable memory is programmed with a number representing a temporary pass code after the entry of a higher order pass code by the individual setting the temporary pass code. The permanent pass code may be made more complex than the temporary pass code to provide an extra level of security by providing that the permanent pass code have more digits. Timing circuitry is provided to establish a temporary pass code entry window during which a temporary pass code may be entered into the eraseable memory. No entry of a temporary pass code within the alloted time results in a disabling of the temporary pass code system.

22 Claims, 3 Drawing Figures

SECURITY SYSTEM WITH MULTIPLE LEVELS OF ACCESS

This application is a continuation of application Ser. No. 06/295,621, filed 08/25/81 and abandoned.

FIELD OF THE INVENTION

This invention relates to security systems and more particularly to a system for providing differing levels of access to the security system.

BACKGROUND OF THE INVENTION

Security systems in general require the entry of a predetermined digital pass or access code in order to disarm the system so that authorized users of the system may operate freely within a protected area. The protected area may be a plant, residence or even a location within a building. These protected areas are commonly protected by two generically different types of systems. The first type of system is usually enabled 24 hours a day and can include fire detection or detection of an emergency situation which, for instance, could be the actuation of a hold-up switch, the occurrence of a medical emergency, or the actuation of a "panic button" to indicate an unspecified emergency. Other types of continuously monitored systems include tamper detection or facility monitoring including the transmission of data such as building temperature, boiler pressure, etc., for recording and analysis.

Other types of protection provided by security systems include those which are actuated on a periodic basis, for instance, at night or when personnel leave a protected facility. This type of detection includes volumetric protection in which motion sensors of the ultrasonic, passive infrared, or microwave variety detect motion within a given area. Other types of systems which are actuated on a periodic basis are perimeter detection systems and more particularly point detection systems in which for instance door contacts are utilized to detect the intrusion into a building through the door. Vibration detectors detect, for instance, footsteps or the use of saws and acetylene torches, whereas glass break detectors detect the intrusion via the breaking of glass. Moreover, for safes, capacitive proximity detectors are utilized. It is a feature of these latter types of protection that they are to be disarmed during off hours by maintenance personnel, and service personnel or others who need access to the facility. It is, however, desirable that such personnel not be given overall access to the system to avoid compromising the entire system. More specifically, it is highly detrimental to give out a single pass code to everyone needing access to a building because this may permit resetting of the system, enable a user to by-pass selected protection loops, or permit a user to reprogram the system. Such a situation is equivalent to giving out a master key that provides unlimited access to a facility. In short, a single pass code cannot provide for different levels of access. Thus, a single pass code system cannot distinguish between the duties of a general manager and those of a janitor. It is therefore convenient that a system be made to operate with codes which may be assigned as frequently as on a daily basis so as to provide only limited access for certain levels of personnel.

For residential applications, it is also sometimes desirable to permit persons access to a house for a limited period of time as for a vacation without revealing a permanent pass code which would enable entry at an other than authorized time. Providing a permanent pass code would, in effect, be giving an individual a master key which could be utilized at any time.

Thus, the security systems which utilize a single pass code suffer from the inability to establish various levels of access to the facility. Moreover, when a single pass code is used, it is not conveniently changed for temporary access situations, primarily due to problems in notifying all users of the system.

SUMMARY OF THE INVENTION

In the subject system, at least two access levels are provided by providing a permanent pass or access code and an alterable temporary pass or access code in which the temporary pass code may be set after entry of the permanent pass code. This permits the highest level user with the ability to access all the functions of the security system at will, yet provide limited access to another level of personnel. For instance, the permanent pass code may permit disarming of the system or selected parts of the system, resetting of all or part of the sensors used in the system, loop by-pass, and programming including the setting of the temporary pass code. On the other hand, use of the temporary pass code can permit the disarming of only a portion of the system. As an example, assuming latchable fire alarm sensors in a 24 hour loop, it would not be prudent to give anyone other than a general plant manager the ability to reset these sensors, since the decision that a first emergency is either over or non-existent is usually made at a very high level of authority. Moreover, giving temporary help access to reprogramming an entire system defeats the security provided by the system.

In one embodiment, a four digit code is selected and is permanently stored in a programmable read only memory (PROM). The four digit code permits access to selectable functions which, can include, an alarm disarm function both for "home" and "away" in which sensors in a so-called night loop may be disarmed as well as a communicator such as a dialer which would report an alarm condition to, for instance, a police station, a fire station, or a remotely-located central monitoring station. Additionally, for those systems provided with alarm delays to permit entry or exit, the entry of the four digit code could provide for an instant alarm indication by cancelling the delay. The four digit code can also permit bypassing of protective loops such as for instance the perimeter detection loops, the motion detector loops and the detector loops for instance protecting a safe within the protection zone. The entry of the four digit code also permits the operation of the system in a test mode which, in many cases, includes a walk-through testing of all of the sensors utilized in the system. The four digit code permits the entry or deletion of a temporary pass code. Finally, the entry of the four digit permanent code can serve to reset the entire system which may include the unlatching of indicator lamps and the resetting of sensors throughout the facility.

On the other hand, the temporary pass code can provide for only an alarm disarm function in which local alarms may be disabled to allow access to the facility by the lower level personnel. Use of the temporary pass code can also be made to interrupt communication of an alarm condition status to a remote location.

Additionally, temporary access codes can be made to cancel non-latched alarm condition indications such as, for instance, the unintentional tripping of a hold-up button, which tripping might have been accidently caused by second level personnel. For all latched alarm conditions such as for instance fire or unauthorized perimeter intrusion, the temporary personnel would not have access to disarming the system as an added precaution against the compromise of the system by temporary personnel. Thus, temporary personnel can be precluded from being able to disarm electric fences, photoelectric sensors utilized in protecting the grounds of a given facility, etc.

The entry of the temporary access code in one embodiment does not affect the 24 hour loops, whereby a fire protection loop may be allowed to operate regardless of whether temporary personnel are within the area.

The provision of the security system with multiple levels of access by providing temporary pass codes permits the selection of which protection loops may be activated or deactivated by designation levels of personnel as well as providing ease of code change to protect against the effects of transient personnel leaving the employ and therefore control of the authorized users of the system. Moreover, an added layer of security may be obtained by providing temporary pass codes of decreased complexity, such that, for instance, a permanent pass code may have four digits, while a temporary pass code may have three digits. The system may be made to operate with more than two levels of access, with decreased levels of access being capable of affecting fewer system functions.

As an added security feature, in one embodiment timing circuitry is provided to establish a time window during which a temporary pass code is to be programmed into an eraseable memory. As an added security precaution, if no temporary pass code is entered, the temporary pass code portion of the system is disabled, at least until the permanent pass code is reentered and a code key depressed.

DESCRIPTION OF THE DRAWINGS

These and other features of the subject invention will be better understood in conjunction with the following detailed description taken in conjunction with the drawings of which.

DETAILED DESCRIPTION OF THE INVENTION

Figure 1:
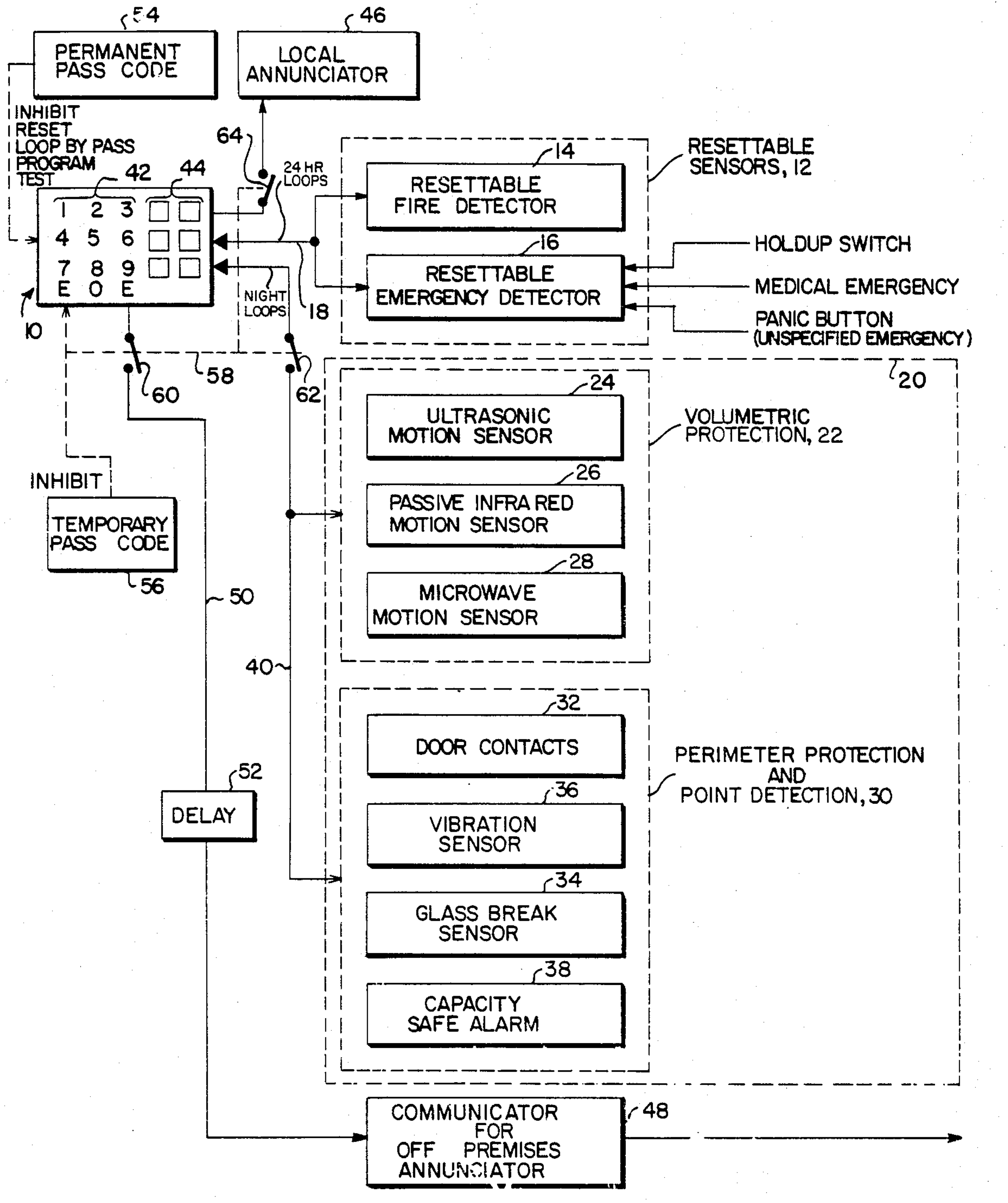
FIG. 1 is a block diagram of a security system illustrating the utilization of permanent and temporary pass codes.

In order to provide for multiple levels of access to a security system, and referring now to FIG. 1, a security system typically includes a central control unit 10 and a number of sensors located throughout the premises to be protected, with the sensors being connected typically by multi-wire cables to the control unit. The sensors, in general, are usually divided into two groups, the first of which being a group of resettable sensors which are activated twenty-four hours a day and are therefore referred to as being in twenty-hour hour loops. The resettable sensors are illustrated in dotted block 12 to include fire detectors 14 or an emergency detector 16 which may have as inputs a hold-up switch, a medical emergency remote transmitter, or a panic button which when actuated, is designed to alert security personnel to an unspecified emergency. Alarm and status signals from the resettable sensors 12 are carried over a transmission line generally designated by reference character 18 which also includes command signals and power transmitted from the control unit to the resettable sensors.

On the other hand a group of sensors designated by reference character 20 are periodically actuated sensors normally operated at night to detect intrusion into a given area. These sensors are in turn divided into two classes, the first of which being a volumetric protection group 22 which may include ultrasonic motion sensors 24, passive infrared sensors 26 or microwave motion sensors 28. The second group is a perimeter protection and or point detection group 30 which, in general, are located at the perimeter of the facility to be protected and include door contacts 32 or glass break detection apparatus 34. Point detectors within the protected area may include a vibration detector 36 or a capacitive safe alarm 38. The types of sensors mentioned above are by no means exhaustive of the type of sensors that could fall in either one of the two above categories, but are rather detailed in order to represent classes of sensors which may be deactivated during normal working hours and activated at night or during non-working hours. These sensors are connected via cable 40 to control unit 10, with control unit 10 also supplying power and control signals to the sensors. The control unit includes a keypad 42 and function switches 44, with one of the outputs of the control unit being coupled to a local annunciation unit 46. Local annunciation can be in the form of a lighted panel board indicating not only the occurrence of a specified alarm condition, but also its location, but may also include sirens and the like for giving an audible indication of an alarm condition having been sensed. In addition to local annunciation, off-premises annunciation can be accomplished through the utilization of a communicator 48 which, in general, includes a dialer for dialing a police department, a fire department or an off-premises security office. In one embodiment, the output of the control panel is coupled via line 50 through a delay circuit 52 to the communicator with the purpose of the delay unit being to delay the off-premises annunciation of an alarm condition pending determination as to whether or not the alarm condition indication is to be communicated off-premises rather than being addressed by on-location personnel.

A permanent pass code 54 is entered into keypad 42 for either arming or disarming the entire system or for permitting alteration of the system to provide for specific needs. For instance, the entry of the permanent pass code may permit an inhibiting function in which the entire system or portions thereof may be disarmed. In addition, after utilizing the permanent pass code, certain of the resettable sensors may be reset or certain loops or loops within loops may be bypassed. Additionally, the entry of the permanent pass code may permit the programming of a temporary pass code in an eraseable memory within the control unit so as to permit the aforementioned second level of access to the system. Further, the entry of the permanent pass code permits the running of a test sequence. When a temporary pass code is used, a temporary pass code as illustrated at 56 may be entered into the keypad, with the ability to alter the system limited to inhibiting the night loops as one example. As mentioned hereinbefore, the utilization of a temporary or second level pass code greatly facilitates the security of the system while allowing temporary access during off hours. As diagrammatically illustrated by dotted lines 58, the utilization of the temporary pass code can, for instance, interrupt off-premises annunciation as by actuating switch 60, or inhibit the alarm condition signals from the sensors 20 from being transmitted to the control unit as indicated by switch 62. Moreover, local annunciation of an alarm condition may be inhibited as by switch 64, with all of the aforementioned switches activated to open up the respective circuits when the temporary pass code has been entered into the control unit.

Figure 2:
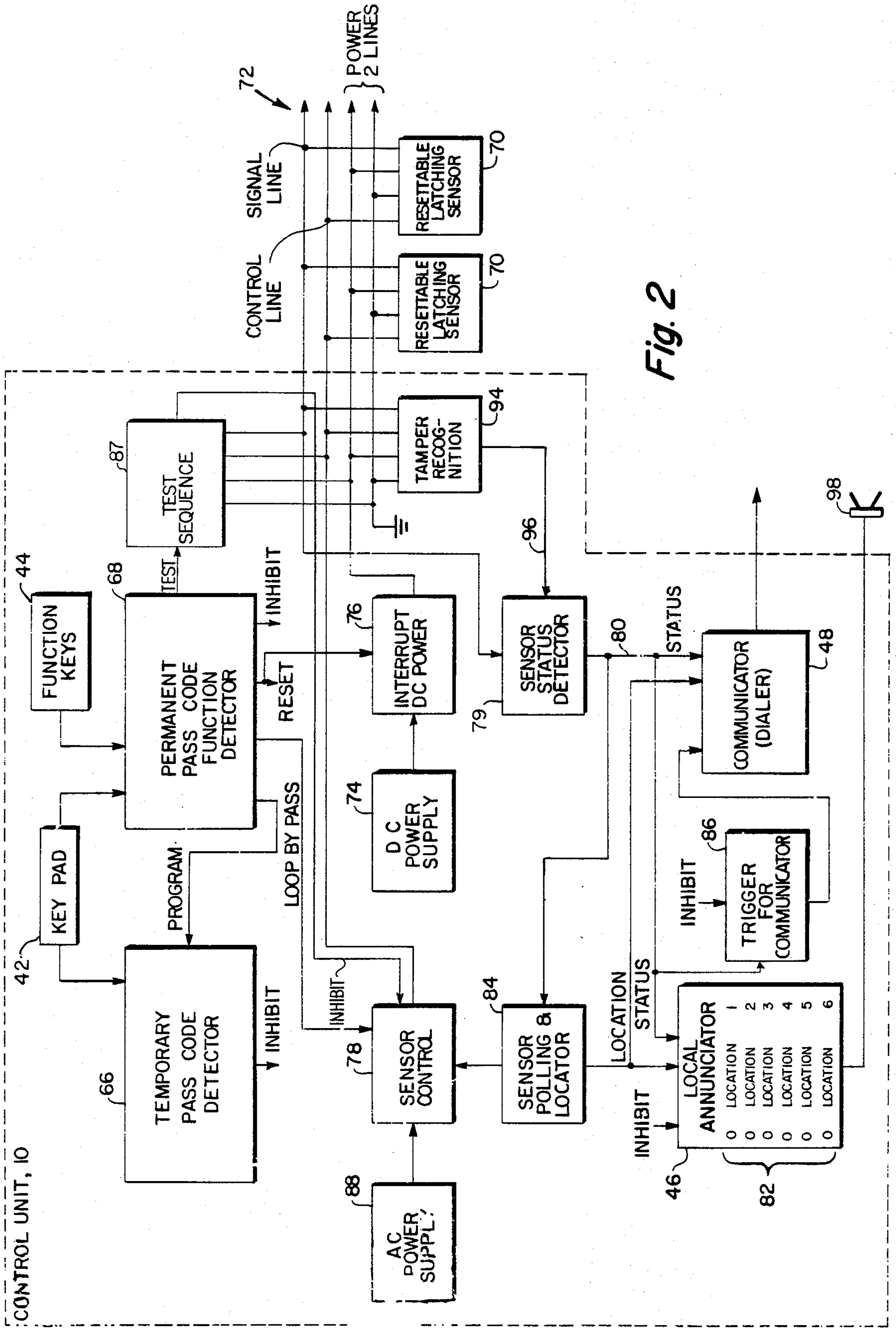
FIG. 2 is a block diagram illustrating selective access to a security system through the utilization of different pass codes.

How one such system might operate is illustrated in FIG. 2 in which like reference characters are utilized to designate like elements in FIG. 1. In this figure, control unit 10 is illustrated as including keypad 42 and function keys 44. One of the function keys may be a so-called "code key" which in combination with the entry of a permanent pass code, routes the output of the keypad to a temporary address code memory so as to program it with a temporary pass code. In the embodiment illustrated, the keypad is coupled to a temporary pass code detector 66 and a permanent pass code and function detector 68, with the function keys coupled to the permanent pass code and function detector 68. In the system depicted in FIG. 2, resettable latching sensors 70 are coupled to a multiwire transmission line generally designated at 72 which is utilized, for instance, to supply d.c. power from a d.c. power supply 74 to the sensors through a d.c. power interrupt circuit 76, Control signals for the sensors including actuating and deactuation thereof, are generated by a sensor control unit 78 which may be of a conventional variety to provide control signals along one of the wires of the multiwire cable to the sensors. A ground wire is also illustrated as being one of the wires of multiwire cable 72. Control unit 10 additionally has a sensor status detector 79 coupled to a signal line which is one of the lines of the multiwire cable, the purpose of which is to determine an alarm condition signal coming from one of the sensors attached to the multiwire cable. In one embodiment, (not shown) the alarm signal in the signal line may be in the form of a current drawn from this line, the drawing of current providing the alarm indication. The output of status detector 79 is a signal which is applied over line 80 to local annunciation unit 46. In the embodiment shown, this unit may include a panel of lights or other indicators 82 which indicate not only the presence of an alarm condition, but the location of the alarm condition. Location can be established by conventional polling techniques in which a clocked sensor polling locator 84 is coupled to sensor control 78 to provide for the strobbing or polling of the various sensors in a timed sequence. The arrival back of an alarm condition indicating signal at the time that a sensor is polled is detected at sensor polling locator 84 which activates a corresponding annunciator indicator 82.

The location and status signals may also be applied to communicator 48 which may include a dialer which is automatically actuated in accordance with a trigger signal from trigger 86 to dial, for instance, a fire or police station and transmit the status and location signals to the off-premises location.

One of the outputs from the permanent pass code and function detector is a signal delivered to a test sequence unit 87 coupled to the multiwire transmission line for initiating a test sequence, while at the same time inhibiting sensor control 78. During test, unit 87 takes over all of the sensor control functions so as to be able to actuate the sensors in accordance with a predetermined test sequence. The test sequence may include a "walk-by" test or other conventional testing techniques.

An a.c. power supply 88 may be coupled to sensor control 78 to provide a.c. power for any of the sensors requiring same or to provide high frequency carrier signals if such is desired.

In the illustrated embodiment, a tamper recognition circuit 94 is coupled across the lines of the multiwire cable, with recognition of tampering being an alarm condition, a signal for which is applied via line 96 to sensor status detector 79.

In operation, the entry of a temporary pass code is detected by temporary pass code detector 66 which develops an inhibit signal applied as illustrated to local annunciator 46 and trigger 86 to inhibit local annunciation and off-premises communication. The inhibiting of the local annunciation may also include the inhibiting of an audible indication of an alarm condition as would be provided by a loud speaker 98. It will be appreciated that the permanent pass code and function detector, upon entry of a permanent pass code, also provides an inhibit signal for the self-same purposes. However, the entry of a permanent pass code provides additional levels of access to the system in which the temporary pass code can be programmed, the system tested, in which various loops can be by-passed as indicated by the line running from the permanent pass code and function detector to sensor control 78, or can result in a reset signal being applied to reset all of the resettable latching sensors. As is conventional, resettable sensors can be reset by merely interrupting the d.c. power to the latching relay coil usually used in the sensor and this is accomplished as illustrated.

The functions of the polling of sensors, the detection of the types of alarm signals provided by sensors, test procedures, and the ability to provide a loop bypass function are conventional and are not described herein. It will be appreciated however, that it is a feature of the subject invention that the utilization of a temporary pass code allows only a limited access to the system in that, as illustrated in the FIG. 2 embodiment, its only capability is to inhibit local annunciation and off-premises annunciation. On the other hand, the entry of the permanent pass code allows additional functions, such as inhibiting, programming, loop by-passing, testing, and resetting. While the rather simplified system of FIG. 2 is operative to describe the effects of multiple level access, the number of functions to be accessible by a given level of user varies with the particular system application. While only two levels of access have been described in connection with the embodiment of FIG. 2, it will be appreciated that any number of levels of access involving different numbers of functions can be incorporated into a security system and are within the scope of this invention.

Figure 3:
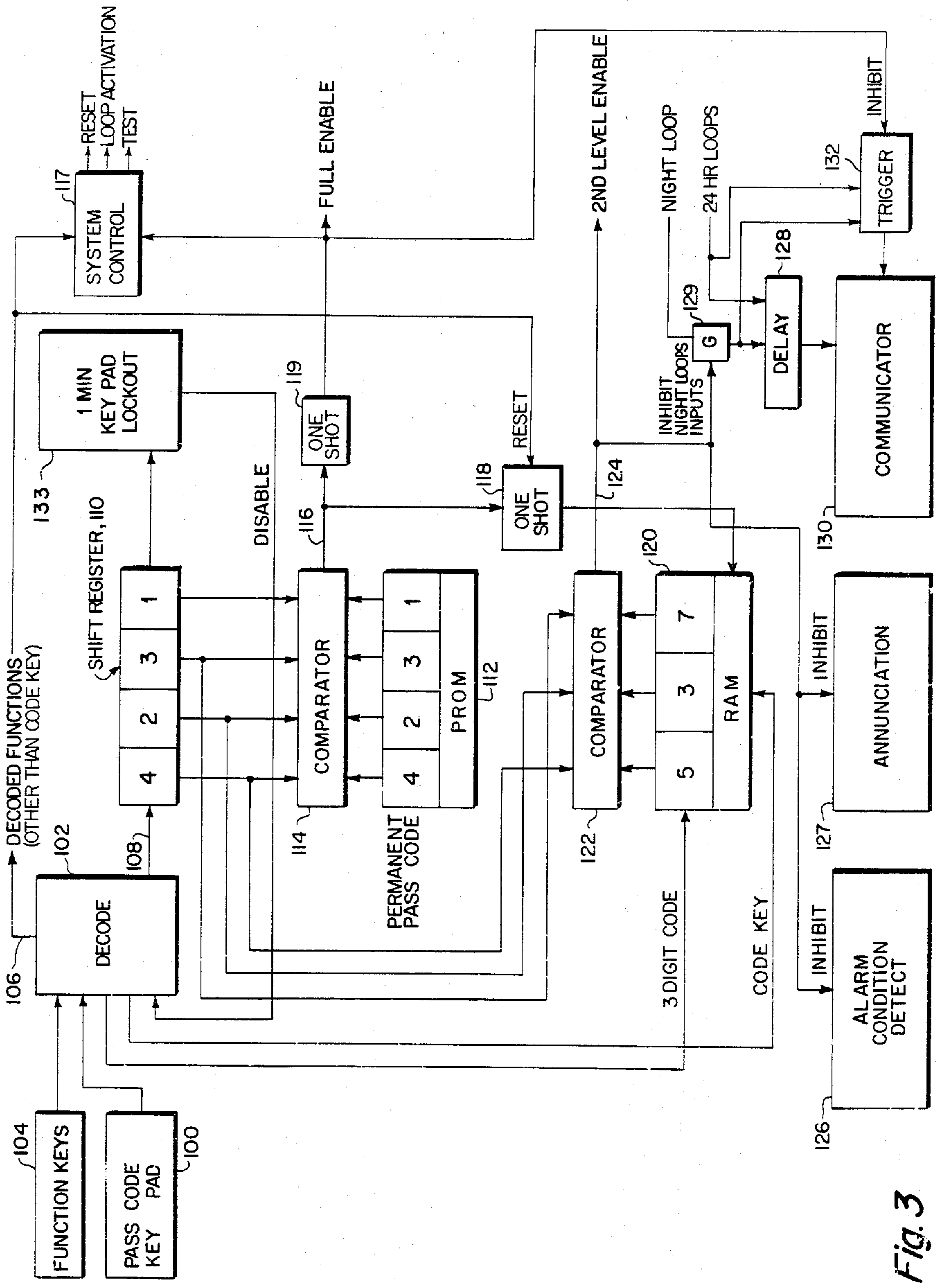
FIG. 3 is a more detailed block diagram illustrating one embodiment of the system illustrated in FIG. 2.

In describing one type of multiple level pass code system and referring now to FIG. 3, a keypad 100 is utilized to drive a decode circuit 102 which decodes the output of the keypad. In general, keypads are numeric entry devices as opposed to providing function keys 104 which may be also provided. Thus, the keypad serves the major function of providing a pass code whereas the function keys provide for the actuation of various system functions such as arming, providing for home protection when the premises are occupied or away protection when the premises are unattended, testing of the security system, disabling entrance or exit delays, resetting or silencing. The decode unit decodes the outputs of either the keypad or the function keys and provides decoded functions on line 106, whereas the decoded numbers entered at the keypad are coupled over line 108 to a shift register 110. A programmable read-only memory (PROM) 112 is preprogrammed with a four digit permanent pass code. The PROM is connected to a comparator circuit 114 which compares the permanent pass code to the code entered into shift register 110. In order to gain access to system from the primary level, the permanent pass code is keyed in at keypad 100 and decoded at 102 such that the numbers, for instance 1, 3, 2, and 4, are entered sequentially into shift register 110. Upon the occurrence of the code indicated, comparator 114 produces an output signal over line 116 which serves as a Full Enable signal for the entire system. By "Full Enable" is meant that any system function may be accessed. This is shown by the enabling of a system control unit 117 which provides reset, loop activation and test sequences designated by the function keys and decoded at decode unit 102. The signal on line 116 is additionally applied to a one-shot multivibrator 118 for providing a timing window for the programming of a temporary pass code. In one embodiment, the multivibrator produces an output pulse having a 45-second duration and corresponds to a 45-second enable pulse. The output of the one-shot multivibrator is provided to a random access memory (RAM) 120 as an enabling pulse which enables the writing into the RAM of the temporary pass code, in this case for 45 seconds. Decode unit 102 decodes one of the function keys, the code key, to enable the designated three RAM segments assigned to the second level or temporary pass code, which is in this case is a three digit code. Thereafter, if during the 45 second enable pulse from one-shot multivibrator 118 keypad 100 is actuated, the decoded temporary pass code will be entered into the designated segments in RAM 120 such as to provide a temporary pass code of 7, 3, 5, as indicated. If no temporary pass code is entered during the 45-second window provided by the one-shot multivibrator, zeros are entered into the selected RAM memory sections. The system is structured such that it will not respond to zeros and thus, the temporary pass code system is disabled. Moreover, should a function key be actuated after the code key, a signal on line 106 serves to reset one shot multivibrator 118 to prevent the writing in of the non-code key functions into the RAM.

As an added precaution against unauthorized access, a second one-shot multivibrator 119 is interposed in line 116 to provide another timing window within which a function key must be actuated. This prevents against function keys being actuable, for instance, an hour after a permanent pass code has been entered. In one embodiment, this window is 45 seconds in duration, which means that a function key must be actuated within 45 seconds or its activation will not be accepted by the system.

After a temporary pass code has been entered into RAM 120, secondary access to the security system can be obtained by the entry at keypad 100 of the temporary pass code. Upon entry of the pass code into the first three sections of shift register 110 and upon a matching output from the three RAM sections, a comparator 122 produces a Second Level Enable signal over line 124 which is utilized to inhibit an alarm condition detection circuit 126 and an annunciation circuit 127 which may be a zone indicator or any type of audio or visual alarm indication. Additionally, should a communicator be utilized, the signal on line 124 inhibits all night loop inputs to a delay unit 128 transmitted through a gate 129 which is coupled to a communicator 130. Communicator 130 is triggered by receipt at trigger 132 of either night loop or 24 hour loop signals, with this system being given the capability of inhibiting the off-premises transmission of 24 hour loop signals only by entry of a permanent pass code. This is unlike the system of FIG. 2 in which both pass codes inhibit off-premises transmission. Note further that in the FIG. 3 embodiment, the use of the temporary pass code interrupts night loop signals so that the trigger is inhibited only for these signals. It will be appreciated that the 24 hour loop signals are not interrupted by virtue of the provision of a temporary pass code such that the 24 hour loops are continuously monitored by virtue of the communicator. Note also that the interruption of the transmission of the 24 hour loop signals occurs only when the permanent pass code is entered. Additionally, what can be provided is that should the communicator be on line during the entry of a pass code, it will be allowed to continue its transmission for its full transmitting cycle.

What will be appreciated is that both the Full Enable and the Second Level Enable signals are operative to inhibit alarm condition detection and annunciation, and certain off-premises transmissions. The Second Level Enable signals however are incapable of inhibiting 24 hour loop signal transmission or resetting any latched sensor such as a smoke detector, whereas the higher level pass code permits resetting the entire system.

It will also be appreciated that although two levels of access have been provided in terms of decreasing complexity of pass codes, multiple levels of access may be provided with either increasingly or decreasingly complex pass codes.

It is one feature of the subject system that the output of the shift register is applied to a keypad lockout circuit 133, the purpose of which is to count the number of entries into the shift register. For instance in one embodiment, upon 16 separate sequential entries into the shift register, the decode unit 102 is disabled for one minute thereby to preclude, at least to a certain extent, continuous tampering with the security system in an effort to provide all possible codes. Decode unit 102 may be disabled by simply entering a series of zeros, to which the remainder of the system will not respond.

What is therefore provided is a relatively simple system for providing certain levels of personnel with limited access to a secure facility, with the ability to change the temporary pass code through the utilization of the higher level pass code and various function keys. In so doing, the security level for the facility is increased at least against unauthorized access in a way not previously possible with single level systems.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A multiple priority security system providing multiple levels of personnel access to multiple prioritized security controllers of a secured facility, comprising:

means for storing a predetermined top priority code;
a first memory device;
input means for writing a first top priority system access code into said first memory device, and for writing a second and lower priority system access code into said first memory device;
means, connected to said first memory device and to said means for storing said predetermined top priority code, for providing a signal whenever said predetermined top priority code matches said first top priority system access code in said first memory device;
means, connected to said input means and enabled in response to said signal, for controlling substantially all of said prioritized security controllers via said input means;
a second memory device, coupled to said input means and to said first memory device and enabled by said signal, for storing a predetermined second and lower priority code therein via said input means; and
means connected to said second memory device and to said first memory device and operative in response to a match between said predetermined second and lower priority code and said second and lower priority system access code for enabling access to preselected lower priority ones of said prioritized security controllers.

2. The system of claim 1, wherein said signal is a signal pulse, and wherein said controlling means are enabled only for the duration of said signal pulse.

3. The security system of claim 1, wherein said security controllers include bypassable twenty-four hour loops having resettable latches, bypassable night loops, and local and remote annunciators, and wherein said first predetermined and top priority pass code permits keyboard access to resetting, loop bypass, and annunciator inhibit functions.

4. The system of claim 1, wherein said signal is a signal pulse, and wherein said input means is enabled for storing a predetermined second and lower priority code in said second memory device via said input means only for the duration of said signal pulse.

5. The security system of claim 4 wherein said input means includes function control keys including a code key, and wherein said input means is responsive to the entry of said first level code and the depression of said code key to program a subsequent series of digits entered at said keypad as said second level pass code.

6. The security system of claim 1, wherein said first predetermined and top priority pass code and said second predetermined and lower priority pass codes are digital sequences that differ by the number of digits of the corresponding pass code.

7. The system of claim 1, wherein said first memory device is a shift register.

8. The system of claim 1, wherein said predetermined top priority code storing means is a ROM.

9. The system of claim 1, wherein said input means includes a keypad having a plurality of numeric keys and function keys.

10. The system of claim 1, wherein said signal providing means includes a comparator.

11. The system of claim 10, further including a one-shot connected to said comparator.

12. The system of claim 1, wherein said second memory device includes a RAM.

13. The system of claim 1, wherein said means for enabling access to lower priority ones of said prioritized security controllers includes a second comparator.

14. The system of claim 13, further including a one-shot connected to said second comparator.

15. A multiple priority security system simultaneously providing higher level personnel and lower level personnel access respectively to higher priority and lower priority groups of security controllers of a secured facility that are ranked on a preselected priority basis in such a way that the higher level group includes all of the security controllers of the lower level group, but the lower level group excludes some of the security controllers of the higher level group, comprising:
a keypad; and
means connected to said keypad and operative in response to entering a first predetermined and top priority pass code on said keypad for enabling keypad control of said higher level group of said prioritized security controllers, and said means being further operative in response to entering a second predetermined and lower priority pass code on said keypad for enabling keypad control of said lower level group of said prioritized security controllers.

16. The system of claim 15, further including a memory, and means responsive to said first predetermined and top priority pass code for enabling keypad programming of said memory with said predetermined second and lower priority pass code.

17. The system of claim 15, wherein said security controllers include a local annunciator and a remote annunciator, and wherein said keypad control enabling means is operative to response to said second predetermined and lower priority pass code to inhibit the operation of said local and said remote annunciator.

18. The system of claim 15, wherein said security controllers include a local annunciator and a remote annunciator, and wherein said keypad control enabling means is operative in response to said top priority pass code to inhibit remote annunciator operation and operative in responsive to said second and lower priority pass code to inhibit said local annunciator.

19. The system of claim 15, wherein said security controllers include twenty-four hour loops, and wherein said keypad control enabling means is operative to inhibit said loops only in response to said predetermined and top priority pass code.

20. A method of increasing the security of a keypad-accessed security system having a plurality of security controllers arranged in a predetermined priority basis, comprising the steps of:
defining a digital sequence pass code format having a first bit length representative of top priority and a second bit length representative of lower priority, said first bit length word having more digits than said second bit length word;
entering a first predetermined and top priority pass code having said first bit length into a keypad to selectively enable keypad access to substantially all of said prioritized security controllers;
entering into said keypad a second and lower priority pass code having said second bit length for enabling access to substantially less than all of said prioritized security controllers and selected lower priority ones of said prioritized security controllers;

whereby, lower level personnel cognizant of said second and lower priority pass code thereby have access to said predetermined and lower priority ones of said prioritized security controllers, and higher level personnel cognizant of said predetermined top priority pass code have access to substantially all of said security controllers of said secured facility thereby to prevent system tampering by said lower level personnel.

21. The method of claim 20, further including the step of enabling writing into system memory of a selected lower priority pass code only in response to the correct entry of said predetermined top priority pass code and only for a limited time thereafter.

22. The method of claim 20 and further including the step of preventing access to selected controllers of the system at times other than within a time window starting with the entry of a predetermined pass code.

* * * * *